United States Patent
Bidkar et al.

(10) Patent No.: US 12,338,737 B1
(45) Date of Patent: Jun. 24, 2025

(54) SEAL ASSEMBLY FOR A TURBINE ENGINE

(71) Applicant: General Electric Company, Schenectady, NY (US)

(72) Inventors: Rahul Anil Bidkar, Clifton Park, NY (US); Christopher Walter Falcone, Schenectady, NY (US); Grant Robert Portune, Cincinnati, OH (US); Nora Marie Molino, Schenectady, NY (US); Matthew James Misch, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/543,591

(22) Filed: Dec. 18, 2023

(51) Int. Cl.
- *F01D 11/00* (2006.01)
- *F01D 17/16* (2006.01)
- *F02C 7/28* (2006.01)

(52) U.S. Cl.
CPC .......... *F01D 11/001* (2013.01); *F01D 17/162* (2013.01); *F02C 7/28* (2013.01)

(58) Field of Classification Search
CPC ...... F01D 11/00; F01D 11/001; F01D 17/162; F16J 15/44; F16J 15/441; F16J 15/442; F02C 7/28
See application file for complete search history.

(56) References Cited

U.S. PATENT DOCUMENTS

| | | |
|---|---|---|
| 5,014,999 A | 5/1991 | Makhobey |
| 5,100,158 A | 3/1992 | Gardner |
| 5,388,843 A | 2/1995 | Sedy |
| 5,503,407 A | 4/1996 | McNickle |
| 5,509,664 A | 4/1996 | Borkiewicz |
| 6,145,843 A | 11/2000 | Hwang |
| 6,505,837 B1 | 1/2003 | Heshmat |
| 6,692,006 B2 | 2/2004 | Holder |
| 6,811,154 B2 | 11/2004 | Proctor et al. |
| 7,726,660 B2 | 6/2010 | Datta |
| 8,002,285 B2 | 8/2011 | Justak |
| 8,490,982 B2 | 7/2013 | Roche et al. |
| 8,641,045 B2 | 2/2014 | Justak |
| 9,045,994 B2 | 6/2015 | Bidkar et al. |
| 9,115,810 B2 | 8/2015 | Bidkar et al. |
| 9,145,785 B2 | 9/2015 | Bidkar et al. |
| 9,255,642 B2 | 2/2016 | Bidkar et al. |
| 9,359,908 B2 | 6/2016 | Bidkar et al. |
| 9,587,746 B2 | 3/2017 | Bidkar et al. |
| 9,976,420 B2 | 5/2018 | Tran et al. |
| 10,161,259 B2 | 12/2018 | Gibson et al. |
| 10,190,431 B2 | 1/2019 | Bidkar et al. |
| 11,047,481 B2 | 6/2021 | Bidkar et al. |
| 11,085,540 B2 | 8/2021 | Fadgen et al. |

(Continued)

*Primary Examiner* — Elton K Wong (74) *Attorney, Agent, or Firm* — Dority & Manning, P.A.

(57) ABSTRACT

A seal assembly includes a plurality of seal segments for sealing between a rotor and a stator, wherein, when arranged together, the rotor, the stator, and the plurality of seal segments define a high pressure region and a low pressure region. The seal assembly further includes a biasing member engaged with the plurality of seal segments and at least one feature formed in the stator. As such pressurized fluid engaging with the at least one feature provides an aft-to-forward axial force that reduces friction between interfacing aft surfaces of the plurality of seal segments and the stator.

14 Claims, 7 Drawing Sheets

(56) References Cited

U.S. PATENT DOCUMENTS

| | | |
|---|---|---|
| 11,193,590 B2 | 12/2021 | Black |
| 2006/0210392 A1* | 9/2006 | Enderby .............. F16J 15/3288 |
| | | 415/170.1 |
| 2019/0072186 A1 | 3/2019 | Bidkar et al. |
| 2019/0211699 A1* | 7/2019 | Sen .......................... F01D 5/08 |
| 2021/0246987 A1* | 8/2021 | Zimmitti .................. F16J 15/30 |
| 2022/0154590 A1 | 5/2022 | Berard |

* cited by examiner

SEAL ASSEMBLY FOR A TURBINE ENGINE

FIELD

The present disclosure relates generally to turbine engines, and more particularly to seal assemblies for a turbine engine.

BACKGROUND

Gas turbine engines, such as turbofan engines, may be used for aircraft propulsion. A turbofan engine generally includes a bypass fan section and a turbomachine such as a gas turbine engine to drive the bypass fan. The turbomachine generally includes a compressor section, a combustion section, and a turbine section in a serial flow arrangement. Both the compressor section and the turbine section are driven by one or more rotor shafts and generally include multiple rows or stages of rotor blades coupled to the rotor shaft. Each individual row of rotor blades is axially spaced from a successive row of rotor blades by a respective row of stator or stationary vanes. A radial gap is formed between an inner surface of the stator vanes and an outer surface of the rotor shaft. Gas turbine engines may further include various seals to reduce and/or block flow (e.g., working fluid flow) leakage between various components of the gas engine.

BRIEF DESCRIPTION OF THE DRAWINGS

A full and enabling disclosure, including the best mode thereof, directed to one of ordinary skill in the art, is set forth in the specification, which refers to the appended Figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" or "turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "proximate" refers to being closer to one end than an opposite end. For example, when used in conjunction with first and second ends; high-pressure and low-pressure sides; or the like, the phrase "proximate the first end," or "proximate the high-pressure side," refers to a location closer to the first end than the second end, or closer to the high-pressure side than the low-pressure side, respectively.

The term "adjacent" with respect to a relative position of two like components refers to there being no other like components positioned therebetween. The term "adjacent" with respect to a relative position of two different components refers to there being no intervening structure separating the two components.

An "aerodynamic seal" generally refers to a mechanical seal that uses a dynamic rotor and one or more grooves on the rotor or stator that create an air film that the opposing sealing surface rides on. An "aerostatic seal" generally refers to a mechanical seal that uses air from the high-pressure region routed via one or more feed ports (or aerostatic ports) to create an air film between the sealing surface and the opposing rotor. A "hybrid seal" generally refers to a combination of an aerodynamic seal with at least one groove and an aerostatic seal with one or more feed ports to route air from the high-pressure region.

The present disclosure is generally related to a seal assembly having a plurality of seal segments for a turbomachine of a gas turbine engine. A turbomachine generally includes a compressor section including a low-pressure compressor and a high-pressure compressor, a combustion section, and a turbine section including a high-pressure turbine and a low-pressure turbine arranged in serial-flow order. Each of the low-pressure compressor, the high-pressure compressor, the high-pressure turbine, and the low-pressure turbine include sequential rows of stationary or stator vanes axially spaced by sequential rows of rotor blades. The rotor blades are generally coupled to a rotor shaft and the stator vanes are mounted circumferentially in a ring configuration about an outer surface of the rotor shaft. Radial gaps are formed between the outer surface of the rotor shaft and an inner portion of each ring or row of stator vanes. Radial gaps can also be formed between the outer surface of the rotor shaft, and an inner portion of a non-rotating stationary part of the engine.

During operation, it is desirable to control (reduce or prevent) compressed air flow or combustion gas flow leakage through these radial gaps. As such, a seal assembly having a plurality of seal segments is used to seal these radial gaps. More specifically, the seal segments may be disposed between the rotor and the stator. In particular, the rotor, the stator, and the seal segments are arranged together to define a high pressure region and a low pressure region. The segmented seal can be either aerodynamic seal, an aerostatic seal, or a hybrid seal. A spring is engaged with the plurality of seal segments for urging and the seal segments towards the rotor. The stator has at least one feature formed therein. Thus, pressurized fluid engaging with the feature(s) provides an aft-to-forward axial force that reduces friction between interfacing aft surfaces of the seal segments and the stator.

In an embodiment, for example, the feature(s) may be a recess formed in a surface of the stator that creates an intermediate pressure region between the high pressure region and the low pressure region. In such embodiments, the pressurized fluid in the intermediate pressure region provides the aft-to-forward axial force that minimizes the friction between the interfacing aft surfaces of the seal segments and the stator. In alternative embodiments, the feature(s) may include at least one fluid channel formed in the stator. In such embodiments, the fluid channel(s) fluidly connects high pressure fluid in the high pressure region to the interfacing aft surfaces of the seal ring and the stator to provide the aft-to-forward axial force that minimizes the friction between the interfacing aft surfaces of the seal segments and the stator.

Accordingly, the feature(s) described herein are particularly useful when the fence height (e.g., the distance between a radially outer-most surface of the rotor and a radially inner-most surface of the stator) is large. Specifically, a combination of large seal differential pressure and a large fence height can lead to large axial plug loads and an undesirable friction force interference with seal operation. Thus, the features described herein are particularly useful in addressing this issue.

Figure 1:
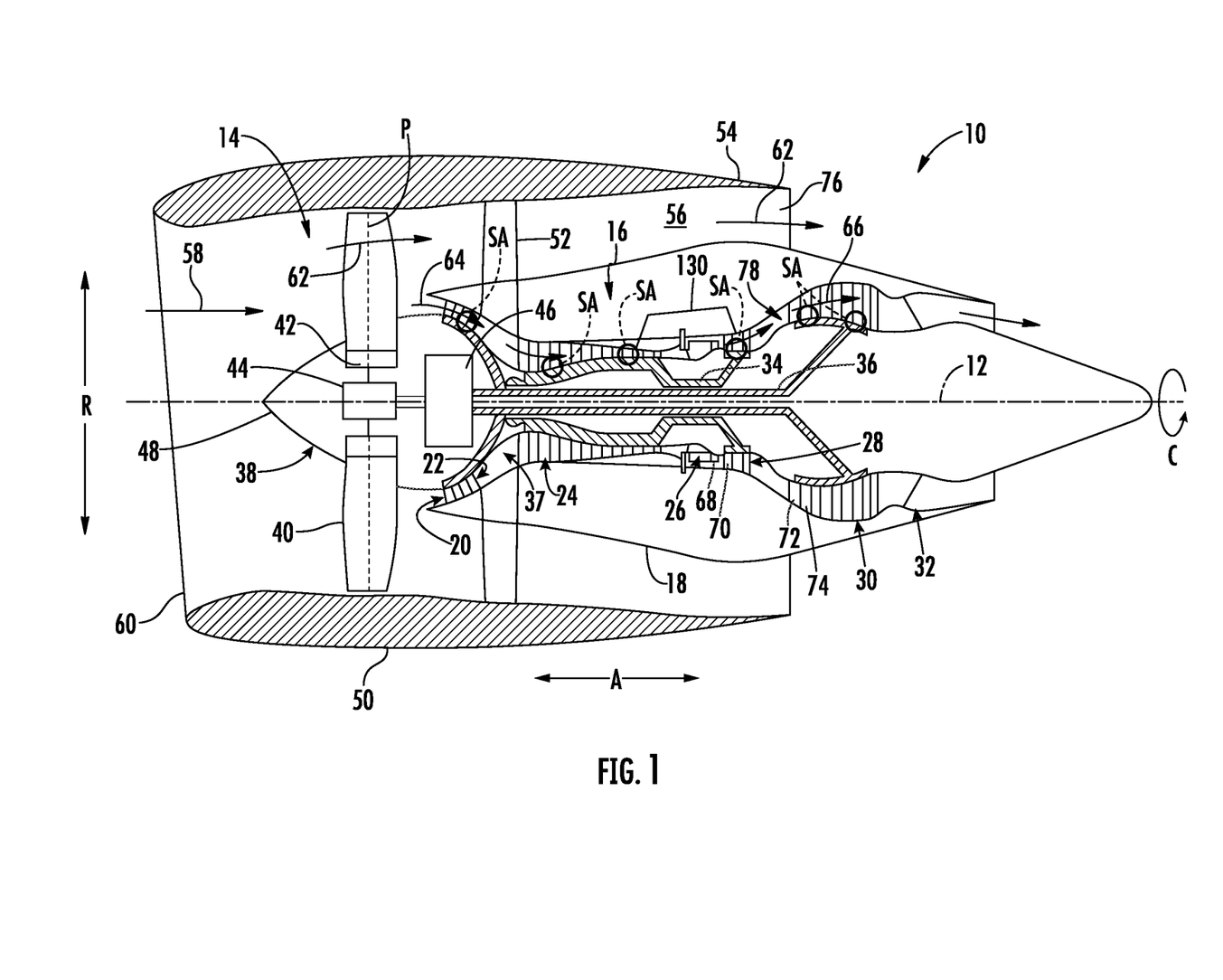
FIG. 1 is a cross-sectional view of a gas turbine engine in accordance with an aspect of the present disclosure.

Referring now to the drawings, wherein identical numerals indicate the same elements throughout the figures, FIG. 1 is a schematic cross-sectional view of a gas turbine engine 10 in accordance with an embodiment of the present disclosure. More particularly, for the embodiment of FIG. 1, the gas turbine engine 10 is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The turbomachine 16 depicted generally includes a substantially tubular outer casing 18 that defines an annular inlet 20. The outer casing 18 encases, in serial flow relationship, a compressor section including a booster or low-pressure (LP) compressor 22 and a high-pressure (HP) compressor 24; a combustion section 26; a turbine section including a high-pressure (HP) turbine 28 and a low-pressure (LP) turbine 30; and a jet exhaust nozzle section 32. A high-pressure (HP) shaft 34 (which may additionally or alternatively be a spool) drivingly connects the HP turbine 28 to the HP compressor 24. A low-pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the embodiment of FIG. 1, the disk 42 is covered by rotatable front hub 48 of the fan section 14 (sometimes also referred to as a "spinner"). The front hub 48 is aerodynamically contoured to promote an airflow through the plurality of fan blades 40.

Additionally, the fan section 14 includes an annular fan casing or outer nacelle 50 that circumferentially surrounds the fan 38 and/or at least a portion of the turbomachine 16. It should be appreciated that the outer nacelle 50 is supported relative to the turbomachine 16 by a plurality of circumferentially spaced outlet guide vanes 52 in the embodiment depicted. Moreover, a downstream section 54 of the outer nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the outer nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the gas turbine engine 10 depicted in FIG. 1 is by way of example only, and that in other embodiments, the gas turbine engine 10 may have any other suitable configuration. For example, although the gas turbine engine 10 depicted is configured as a ducted gas turbine engine (e.g., including the outer nacelle 50), in other embodiments, the gas turbine engine 10 may be an unducted gas turbine engine (such that the fan 38 is an unducted fan, and the outlet guide vanes 52 are cantilevered from, e.g., the outer casing 18).

Additionally, or alternatively, although the gas turbine engine 10 depicted is configured as a geared gas turbine engine (e.g., including the power gear box 46) and a variable pitch gas turbine engine (e.g., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated that in still other embodiments, aspects of the present disclosure may be incorporated into any other suitable gas turbine engine. For example, in other embodiments, aspects of the present disclosure may (as appropriate) be incorporated into, e.g., a turboprop gas turbine engine, a turboshaft gas turbine engine, or a turbojet gas turbine engine.

Figure 2:
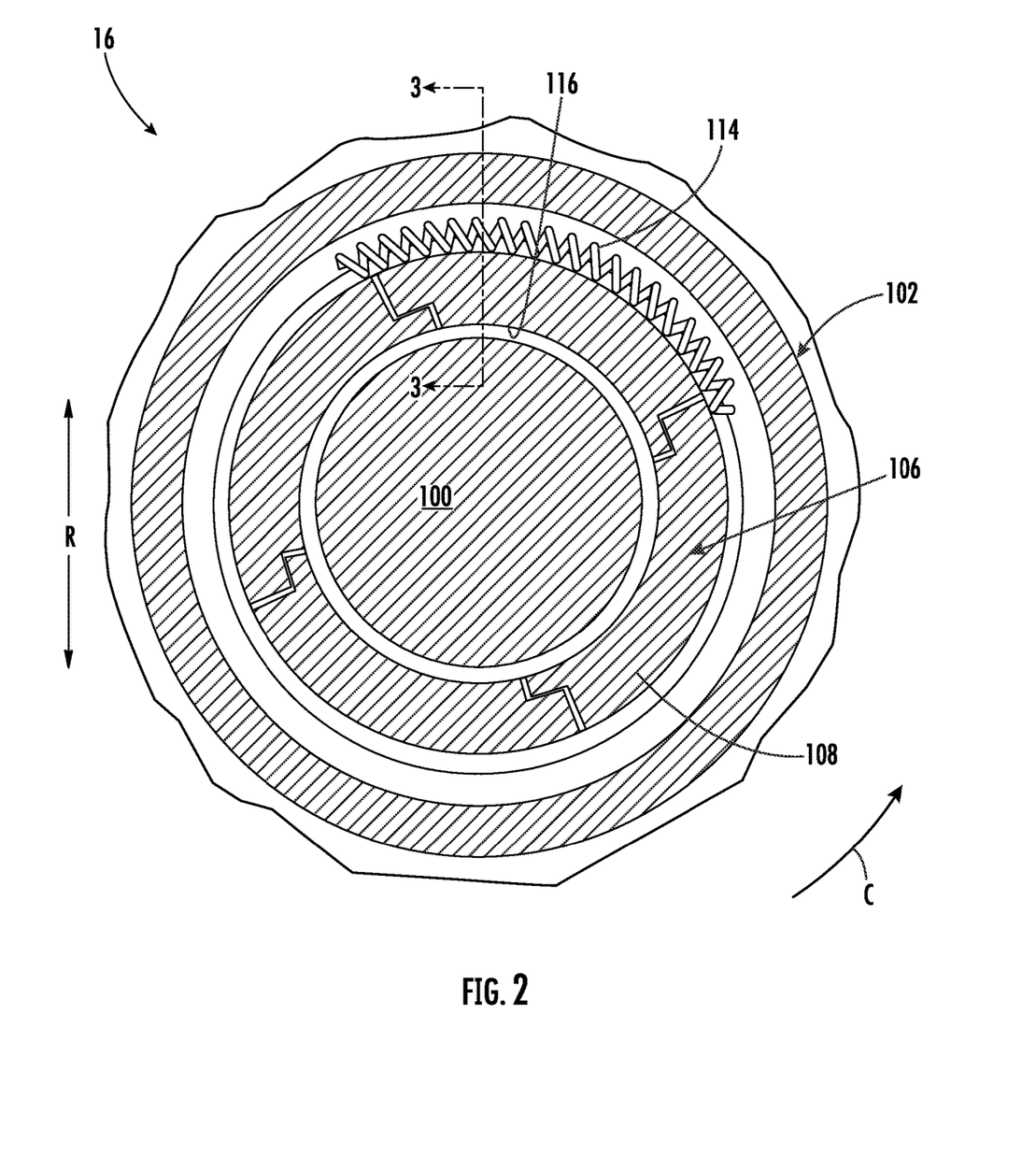
FIG. 2 is a cross sectional, schematic view of a portion of the turbomachine of FIG. 1.
Figure 3:
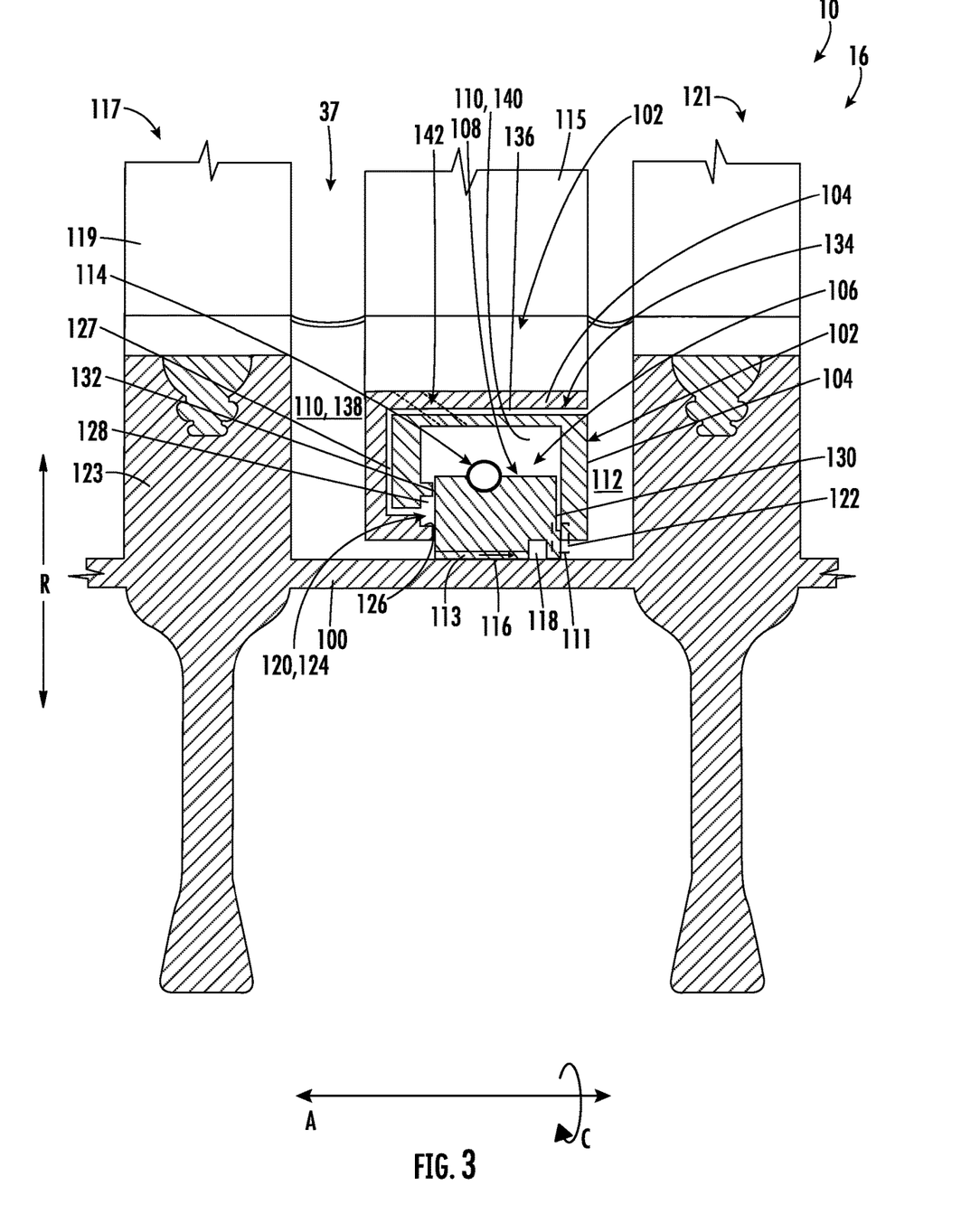
FIG. 3 is a close-up, schematic, cross-sectional view of a portion of the turbomachine of FIG. 2, taken along line 3-3.

Referring now to FIGS. 2 and 3, various views of a portion of the turbomachine 16 of FIG. 1 are provided. In particular, FIG. 2 illustrates a cross sectional, schematic view of a portion of the turbomachine 16 of FIG. 1. FIG. 3 illustrates a detailed, schematic cross-sectional view of a portion of the turbomachine 16 of FIG. 1. As will be appreciated and as generally shown in FIGS. 2 and 3, the turbomachine 16 generally includes a rotor 100, a stator 102, and a seal assembly 106 disposed between the rotor 100 and the stator 102. The rotor 100 may be any rotor of the turbomachine 16, such as the LP shaft 36, the HP shaft 34, etc. By way of example, referring briefly back to FIG. 1, circles SA have been added to FIG. 1 to provide example locations that the seal assembly 106 of the present disclosure may be incorporated into a turbomachine of the present disclosure.

As shown particularly in FIG. 3, the stator 102 further includes a stator vane 115 and the seal assembly 106 is, in the embodiment depicted, positioned at an inner end of a stator vane 115 along the radial direction R of the turbomachine 16. The turbomachine 16 further includes a first stage 117 of rotor blades 119 and a second stage 121 of rotor blades 119 spaced along the axial direction A of the gas turbine engine 10. The seal assembly 106 is positioned between the first stage 117 of rotor blades 119 and the second stage 121 of rotor blades 119 along the axial direction A.

In the embodiment depicted, the seal assembly 106 is positioned within a turbine section of the gas turbine engine 10, such as within the HP turbine 28 or the LP turbine 30. In such a manner, it will be appreciated that the rotor 100 may be a rotor coupled to the HP turbine 28, such as the HP shaft 34, or a rotor coupled to the LP turbine 30, such as the LP shaft 36. More specifically, still, in the illustrated embodiment, the rotor 100 is a connector extending between a disk 123 of the first stage 117 of rotor blades 119 and a disk 123 of the second stage 121 of rotor blades 119. It will be appreciated, however, that in other embodiments, the seal assembly 106 may be integrated into, e.g., a compressor section of the gas turbine engine 10.

Figure 4:
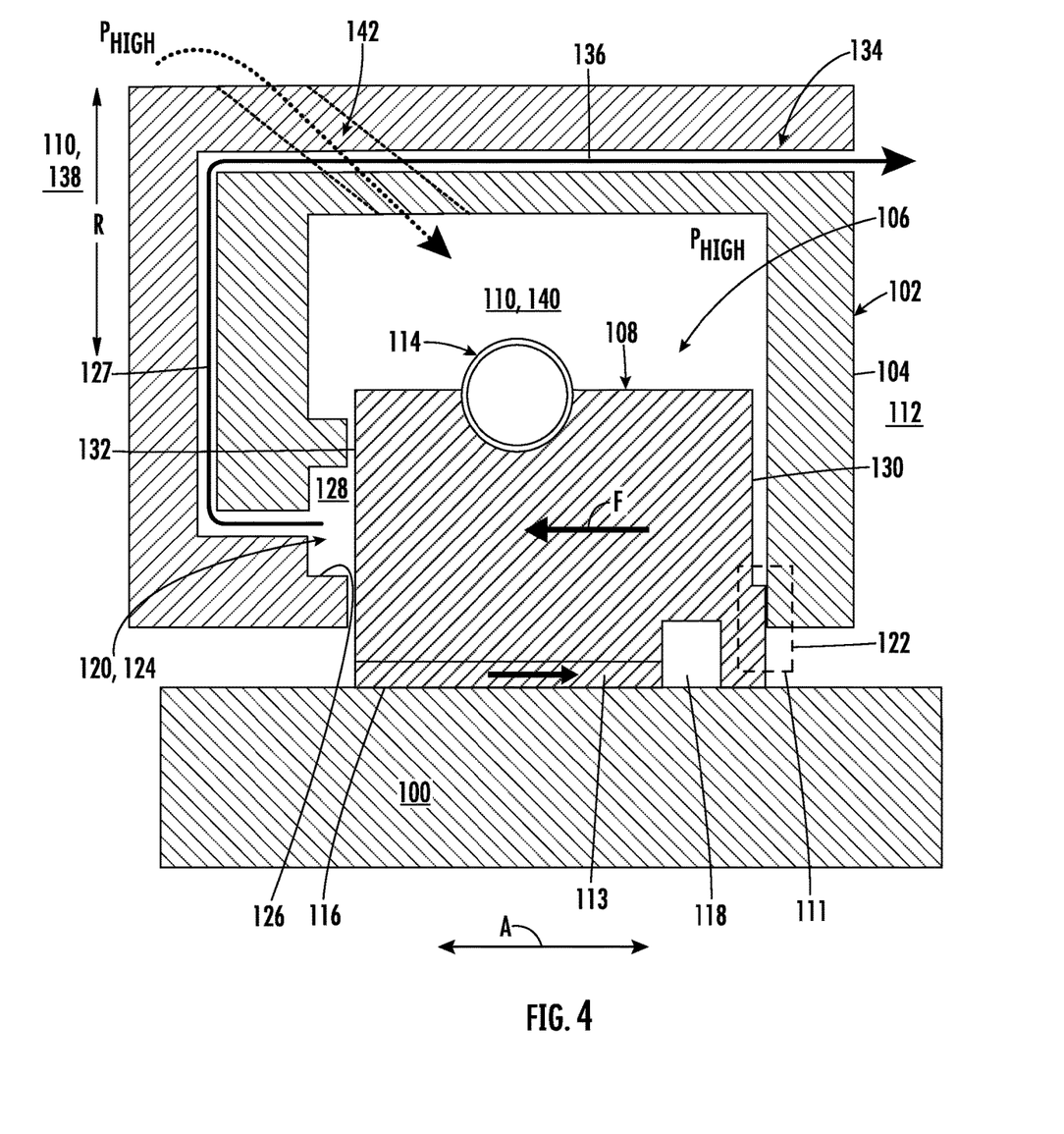
FIG. 4 is a close-up, schematic, cross-sectional view of the rotor, stator, carrier, and seal assembly of FIG. 3, particularly illustrating an aerodynamic seal assembly.

Referring still to FIG. 2, and as will be explained in more detail below, the seal assembly 106 includes a plurality of seal segments 108 that extend along the circumferential direction C between the rotor 100 and the stator 102. Further, in an embodiment, as shown in FIGS. 2 and 4, the seal assembly 106 includes a sealing face 116. Further, as shown particularly in FIG. 4, the rotor 100, the stator 102, and the plurality of seal segments 108 are arranged together to define a high pressure region 110 and a low pressure region 112. In particular embodiments, as shown in FIG. 4, the high pressure region 110 is located forward of the low pressure region 112. In addition, in an embodiment, as shown, the high pressure region 110 generally includes an exterior high pressure area 138 external to the stator 102 and an interior high pressure area 140 interior of the stator 102. As such, the seal assembly 106 is operable to prevent or minimize an airflow from the high pressure region 110 to the low pressure region 112 between the rotor 100 and the seal assembly 106.

As will be appreciated, the seal segments 108 may be in fluid communication with a high pressure air source to provide a high pressure fluid (e.g., $P_{HIGH}$) flow to the seal segments 108. In at least certain aspects, the high pressure air source may be the working gas flowpath 37 provided through the gas turbine engine 10 and the seal assembly 106, e.g., at the high pressure region 110 of the seal assembly 106. In other aspects, the high-pressure air may be secondary flowpath gas sourced from a gas flow path different from the working gas flowpath 37.

Further, as shown in FIGS. 2, 3, and 4, the seal assembly 106 includes a biasing member, such as a spring 114, engaged with the seal segments 108. In an embodiment, for example and as shown, the spring 114 may be a compression spring that urges contact between the seal segments 108 and the rotor 100. In addition, as shown in FIG. 3, one or more of the seal segments 108 of the seal assembly 106 may include a groove 118 in the sealing face(s) 116 thereof. Thus, in an embodiment, the groove(s) 118 is configured to separate the sealing face(s) 116 from the primary tooth or dam 111. One more channels 113 formed in one or more of the plurality of seal segments 108 are used to direct high pressure air from the high pressure region 110 to the groove 118, such that the primary tooth or dam 111 acts as the seal from the high pressure region 110 to the low pressure region 112.

More specifically, and referring to FIGS. 2, 3 and 4, the spring 114 is illustrated as a garter spring 114 that simultaneously encompasses several of the seal segments 108 but is not connected to the stator 102. In such embodiments, as mentioned, the spring 114 is configured to urge the seal segments 108 towards the rotor 100. In alternate embodiments, the spring 114 may also be configured as a coil spring that connects the seal segment(s) 108 with the stator 102. In such embodiments, the spring 114 urges the seal segment(s) 108 away from the rotor 100. Such an embodiment may be generally referred to herein as a retracted spring. Furthermore, in such embodiments, in the absence of differential seal pressure, the retracted spring pulls or "retracts" the seal segment(s) 108 away from the rotor 100. Moreover, upon pressurization, the pressure forces overcome the spring force, and urge the seal segment(s) 108 towards the rotor 100. In further embodiments, additional types of springs (e.g., tension springs, beam flexures, etc.) may be used to connect the seal segment(s) 108 to the stator 102 and/or the rotor 100.

Figure 5:
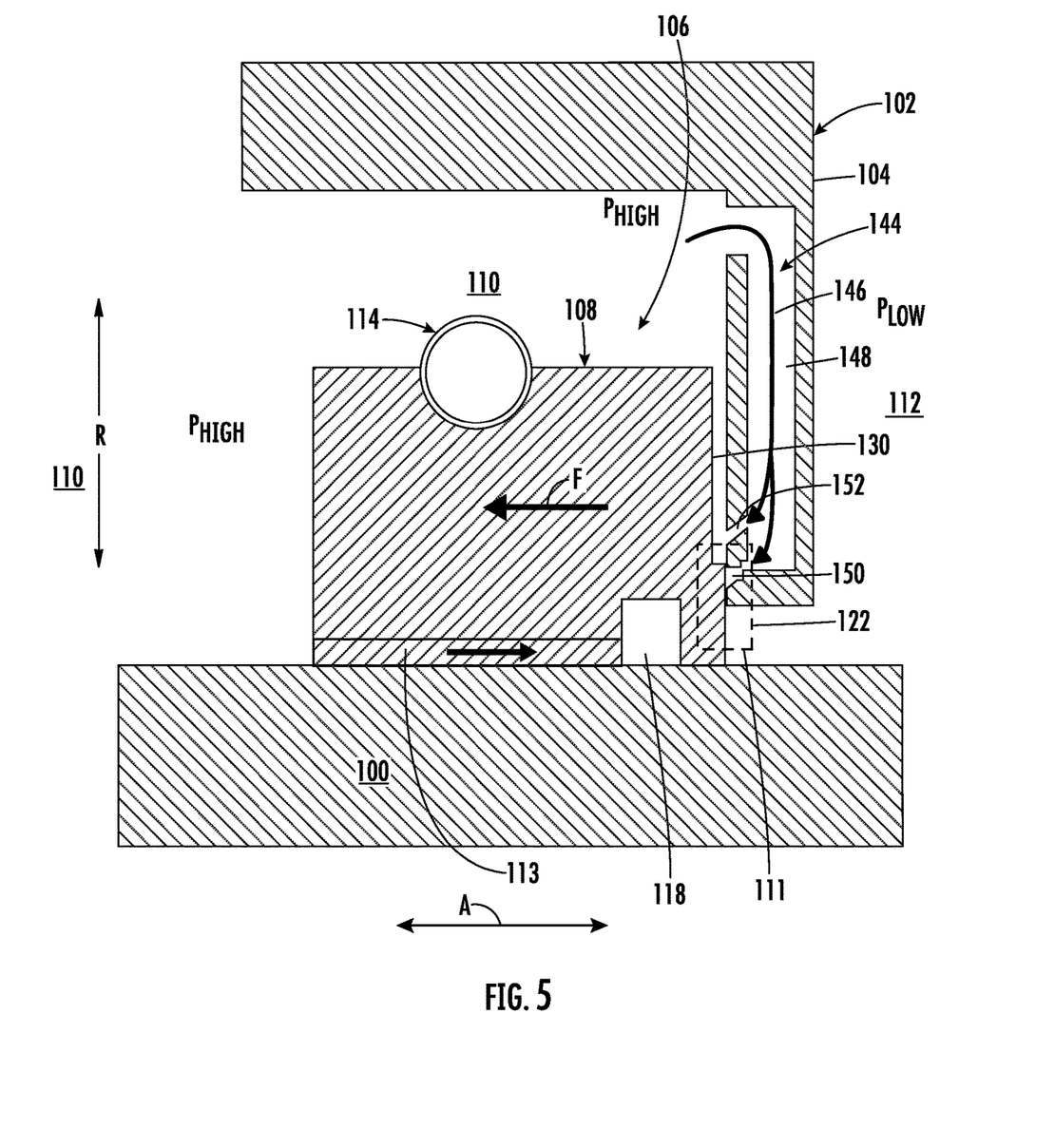
FIG. 5 is a close-up, schematic, cross-sectional view of another embodiment of a rotor, stator, carrier, and seal assembly of a turbomachine in accordance with an aspect of the present disclosure, particularly illustrating an aerodynamic seal assembly.

Referring particularly to FIGS. 4 and 5, various cross-sectional views of different embodiments of the portion of the turbomachine 16 of FIG. 2 along line 3-3 are illustrated. In particular, as shown in FIGS. 4 and 5, the stator 102 includes at least one feature 120 formed therein. As such, pressurized fluid engaging with the feature(s) 120 provides an aft-to-forward axial force F that reduces friction between interfacing aft surfaces 122 of the seal segments 108 and the stator 102.

Referring particularly to FIG. 4, the feature(s) 120 is a recess 124 formed in a surface 126 of the stator 102 that creates an intermediate pressure region 128 between the high pressure region 110 and the low pressure region 112. More specifically, as shown in the embodiment of FIG. 4, the stator 102 may generally have a U-shaped cross-sectional shape in the axial direction A of the gas turbine engine 10 that extends from a first side 130 of the seal assembly 106 in the low pressure region 112 to an opposing, second side 132 of the seal assembly 106 in the high pressure region 110. Accordingly, in an embodiment, as shown in FIG. 4, the intermediate pressure region 128 is defined on the second side 132 of the seal segments 108. Further, as shown, the intermediate pressure region 128 is forward of the seal assembly 106. It should be understood that the stator 102 may be a unitary part or a segmented part. In such embodiments, where the stator 102 is formed of multiple parts, the U-shaped cross section may be formed of cover plate on the forward side, and an inverted L-shape on the aft side, such that when the forward cover plate and the inverted L-shape are attached together (e.g., bolted, welded, brazed, etc.), the resultant cross-sectional shape of the stator 102 is a U-shaped cross-section.

In such embodiments, pressurized fluid 127 in the intermediate pressure region 128 provides the aft-to-forward axial force F that minimizes the friction (e.g., the friction force acting in the radial direction perpendicular to the normal reaction acting in the axial direction) between the interfacing aft surfaces 122 of the seal assembly 106 and the stator 102.

Still referring to FIG. 4, the seal assembly 106 may further include a low pressure vent 134 fluidly connecting the intermediate pressure region 128 to the low pressure region 112. More specifically, as shown, the low pressure vent 134 is disposed in a through channel 136 that extends through at least a portion of the U-shaped cross-sectional shape of the stator 102. Thus, as shown, the pressurized fluid 127 in the intermediate pressure region 128 travels through the through channel 136 of the stator 102 and exits to the low pressure region 112 to provide the aft-to-forward axial force F that minimizes the friction between the interfacing aft surfaces 122 of the seal assembly 106 and the stator 102. The reduced friction force (along the radial direction) is particularly beneficial because it does not hinder the ability of the seal segments 108 to dynamically track the radial excursions of the rotor 100. Conversely, high frictional force can cause the seal segments 108 to become radially stuck on the aft support 122, thereby causing the sealing face(s) 116 to rub against the rotor 100 in motion, thereby causing seal failure.

Figure 6:
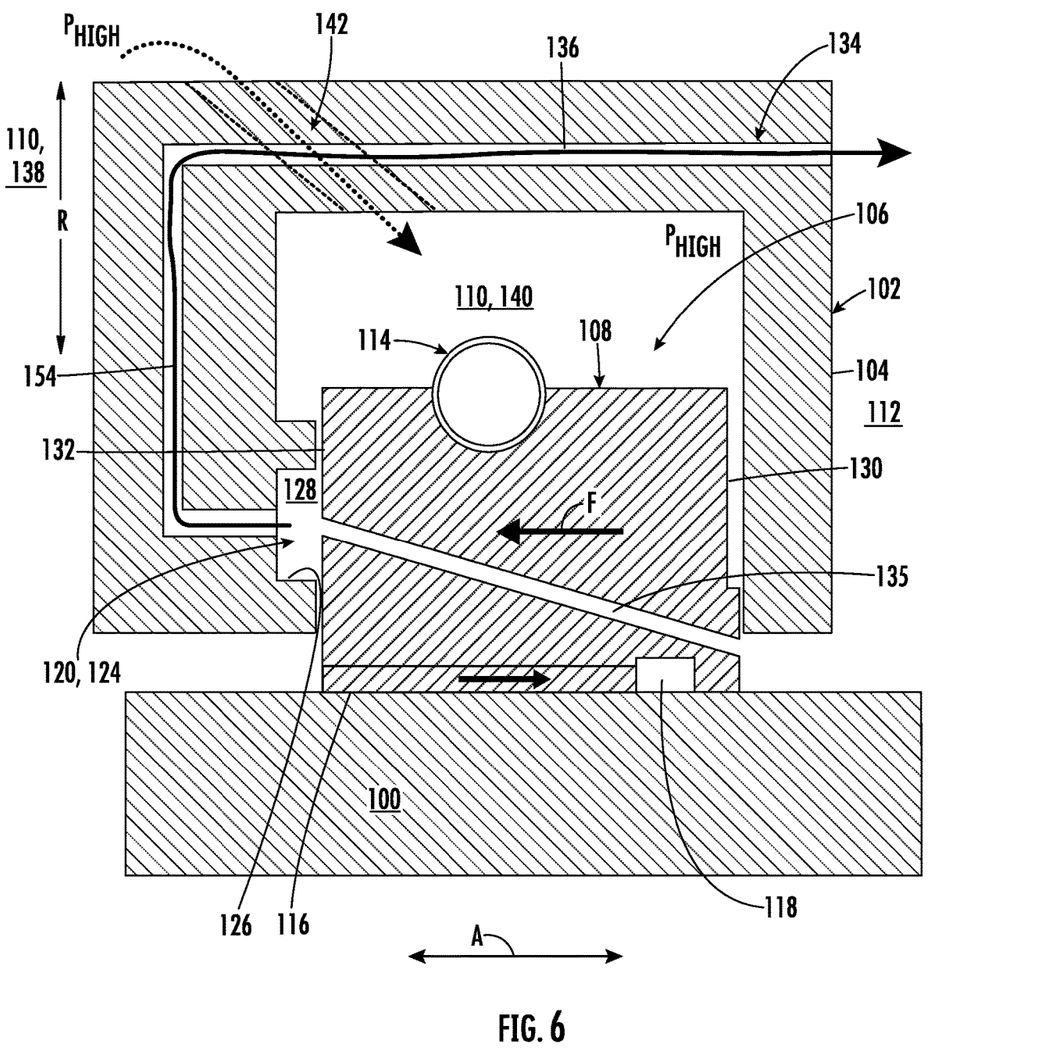
FIG. 6 is a close-up, schematic, cross-sectional view of still another embodiment of a rotor, stator, carrier, and seal assembly of a turbomachine in accordance with an aspect of the present disclosure, particularly illustrating an aerodynamic seal assembly.

Referring now to FIG. 6, another embodiment of a seal assembly 106 according to the present disclosure is illustrated. In particular, as shown, the rotor 100, the stator 102, and the plurality of seal segments 108 are arranged together to define a high pressure region 110 and a low pressure region 112. The embodiment is similar in nature to the embodiment illustrated in FIGS. 2 and 3. In addition, as shown in FIG. 6, the seal segments 108 include a channel 135 that allows airflow from the intermediate pressure region 128 to the low pressure region 112, e.g., through a body of the seal segments 108.

In additional embodiments, as shown, the seal assembly 106 may also include a high pressure vent 142 fluidly connecting the exterior high pressure area 138 of the high pressure region 110 to the interior high pressure area 140 of the high pressure region 110. More specifically, in an embodiment, as shown in FIG. 4, the formation of the intermediate pressure region 128 on the forward side of the seal assembly 106 is enabled via the stator 102 being a U-shaped structure. The U-shaped structure also leads to the formation of the interior high pressure area 140. As such, the pressure in the interior high pressure area 140 needs to be equal to $P_{HIGH}$ such that sufficient closing force (along the radial direction) is generated to urge the seal segment(s) 108 towards the rotor 100. Thus, the high pressure vent 142 allows the exterior high pressure area 138 to be connected to the interior high pressure area 140, thereby ensuring sufficient seal closing force.

Referring now to FIG. 5, as mentioned, a cross-sectional view of a different embodiment of the portion of the turbomachine 16 of FIG. 2 along line 3-3 is illustrated, particularly illustrating a different arrangement of the stator 102. For example, as shown, the feature(s) 120 includes at least one fluid channel 144 formed therein. More specifically, as shown, the fluid channel(s) 144 fluidly connects high pressure fluid 146 (e.g., $P_{HIGH}$) in the high pressure region 110 to the interfacing aft surfaces 122 of the seal segments 108 and the stator 102 to provide the aft-to-forward axial force F that minimizes the friction between the interfacing aft surfaces 122 of the seal segments 108 and the stator 102. In addition, as shown, the fluid channel(s) 144 may include a primary fluid channel 148 and at least one fluid channel branch 150, 152 extending from the primary fluid channel 148.

Thus, in such embodiments, as shown, the fluid channel branch(es) 150, 152 may include, at least, a first fluid channel branch 150 and a second fluid channel branch 152. Further, as shown, the first and second fluid channel branches 150, 152 may be arranged linearly in a radial direction. Accordingly, the fluid channel branch(es) 150, 152 are configured to pressurize the interfacing aft surfaces 122 with the high pressure fluid 146 (e.g., $P_{HIGH}$). As such, rather than a force equal to the high pressure fluid ($P_{HIGH}$) plus half of the low pressure fluid ($P_{LOW}$) acting on the interfacing aft surfaces 122, more of the high pressure fluid 146 (e.g., $P_{HIGH}$) is routed to the interfacing aft surfaces 122 to reduce the axial load (e.g., created by contact between the interfacing aft surfaces 122). Furthermore, in certain embodiments, by providing multiple fluid channel branches arranged linearly in the radial direction R, the interfacing aft surfaces 122 will have $P_{HIGH}$ no matter the radial location of the seal segments 108. Moreover, as shown in FIG. 5, the illustrated embodiment does not include the high pressure vent 142 (shown in FIG. 4) because the embodiment does not include separate exterior and interior regions separated by the U-shaped structure of the stator 102 that requires such venting as described herein.

Figure 7:
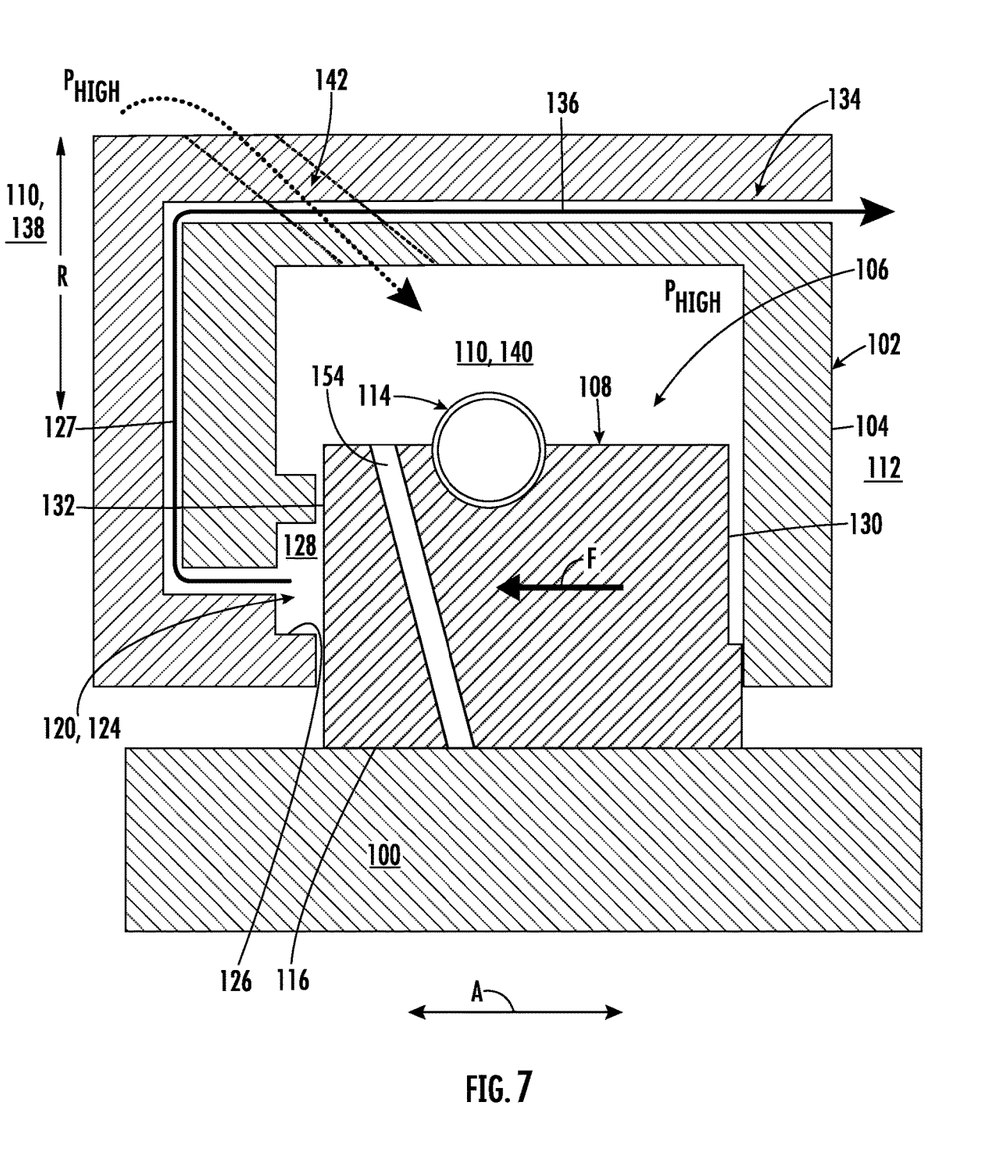
FIG. 7 is a close-up, schematic, cross-sectional view of yet another embodiment of a rotor, stator, carrier, and seal assembly of a turbomachine in accordance with an aspect of the present disclosure, particularly illustrating an aerostatic seal assembly.

Referring now to FIG. 7, a cross-sectional view of a still different embodiment of a portion of the turbomachine 16 is illustrated, particularly illustrating a different arrangement of the stator 102. In particular, as shown, the illustrated embodiment is similar to the embodiment of FIGS. 3 and 4, except the illustrated seal is an aerostatic seal. Thus, as shown, the channel 113 and groove 118 are absent and the seal segment(s) 108 include an aerostatic port 154. Accordingly, the illustrated seal assembly utilizes air from the high-pressure region 110 routed via the aerostatic port 154 to create an air film between the sealing face 116 and the opposing rotor 100.

Further aspects are provided by the subject matter of the following clauses:

A turbine engine, comprising: a rotor; a stator; a circumferential seal assembly comprising a plurality of seal segments, the plurality of seal segments disposed between the rotor and the stator, wherein the rotor, the stator, and the plurality of seal segments are arranged together to define a high pressure region and a low pressure region; and a biasing member engaged with the seal assembly, wherein the stator comprises at least one feature formed therein, and wherein pressurized fluid engaging with the at least one feature provides an aft-to-forward axial force that reduces friction between interfacing aft surfaces of the plurality of seal segments and the stator.

The turbine engine of any preceding clause, wherein the at least one feature comprises a recess formed in a surface of the stator that creates an intermediate pressure region between the high pressure region and the low pressure region, and wherein the pressurized fluid in the intermediate pressure region provides the aft-to-forward axial force that minimizes the friction between the interfacing aft surfaces of the plurality of seal segments and the stator.

The turbine engine of any preceding clause, wherein the high pressure region is located forward of the low pressure region and the intermediate pressure region is forward of the seal assembly.

The turbine engine of any preceding clause, wherein the stator comprises a U-shaped cross-sectional shape in an axial direction of the turbine engine that extends from a first side of the seal assembly in the low pressure region to an opposing, second side of the seal assembly.

The turbine engine of any preceding clause, wherein the intermediate pressure region is defined on the second side of the seal assembly.

The turbine engine of any preceding clause, wherein the seal assembly further comprises a low pressure vent fluidly connecting the intermediate pressure region to the low pressure region.

The turbine engine of any preceding clause, wherein the low pressure vent extends through one or more of the plurality of seal segments.

The turbine engine of any preceding clause, wherein the low pressure vent is disposed in a through channel that extends through at least a portion of the U-shaped cross-sectional shape of the stator.

The turbine engine of any preceding clause, wherein the high pressure region comprises an exterior high pressure area external to the stator and an interior high pressure area interior of the stator.

The turbine engine of any preceding clause, wherein the seal assembly further comprises a high pressure vent fluidly connecting the exterior high pressure area to the interior high pressure area, wherein the high-pressure vent is fluidly separate from the low pressure vent.

The turbine engine of any preceding clause, wherein the at least one feature comprises at least one fluid channel formed in the stator, the at least one fluid channel configured for transporting high pressure fluid in the high pressure region to the interfacing aft surfaces of the plurality of seal segments and the stator to provide the aft-to-forward axial force that minimizes the friction between the interfacing aft surfaces of the plurality of seal segments and the stator.

The turbine engine of any preceding clause, wherein the at least one fluid channel comprises a primary fluid channel and at least one fluid channel branch extending from the primary fluid channel.

The turbine engine of any preceding clause, wherein the at least one fluid channel branch comprises, at least, a first fluid channel branch and a second fluid channel branch, the first and second fluid channel branches arranged linearly in a radial direction.

The turbine engine of any preceding clause, further comprising at least one of a turbine or a compressor, wherein the rotor is at least one of a turbine rotor of the turbine or a compressor rotor of the compressor.

A seal assembly, comprising: a plurality of seal segments disposed between a rotor and a stator, wherein, when arranged together, the rotor, the stator, and the plurality of seal segments define a high pressure region and a low pressure region; a biasing member engaged with the plurality of seal segments; and at least one feature formed in the stator, wherein pressurized fluid engaging with the at least one feature provides an aft-to-forward axial force that reduces friction between interfacing aft surfaces of the plurality of seal segments and the stator.

The seal assembly of any preceding clause, wherein the at least one feature comprises a recess formed in a surface of the stator that creates an intermediate pressure region between the high pressure region and the low pressure region, and wherein the pressurized fluid in the intermediate pressure region provides the aft-to-forward axial force that minimizes the friction between the interfacing aft surfaces of the plurality of seal segments and the stator.

The seal assembly of any preceding clause, wherein the high pressure region is located forward of the low pressure region and the intermediate pressure region is forward of the seal assembly.

The seal assembly of any preceding clause, wherein the stator comprises a U-shaped cross-sectional shape that extends from a first side of the seal assembly in the low pressure region to an opposing, second side of the seal assembly, the intermediate pressure region being defined on the second side of the seal assembly.

The seal assembly of any preceding clause, wherein the seal assembly further comprises a low pressure vent fluidly connecting the intermediate pressure region to the low pressure region, and wherein the low pressure vent is disposed in at least one of a through channel that extends through at least a portion of the U-shaped cross-sectional shape of the stator or through one or more of the plurality of seal segments.

The seal assembly of any preceding clause, wherein the at least one feature comprises at least one fluid channel formed in the stator, the at least one fluid channel configured for transporting high pressure fluid in the high pressure region to the interfacing aft surfaces of the plurality of seal segments and the stator to provide the aft-to-forward axial force that minimizes the friction between the interfacing aft surfaces of the plurality of seal segments and the stator.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A turbine engine, comprising:
   a rotor;
   a stator;
   a circumferential seal assembly comprising a plurality of seal segments, the plurality of seal segments disposed between the rotor and the stator, wherein the rotor, the stator, and the plurality of seal segments are arranged together to define a high pressure region and a low pressure region; and
   a biasing member engaged with the seal assembly,
   wherein the stator comprises at least one feature formed therein,
   wherein a pressurized fluid engaging with the at least one feature provides an aft-to-forward axial force that reduces friction between interfacing aft surfaces of the plurality of seal segments and the stator,
   wherein the at least one feature comprises a recess formed in a surface of the stator that creates an intermediate pressure region between the high pressure region and the low pressure region, and
   wherein the high pressure region is located forward of the low pressure region and the intermediate pressure region is forward of the seal assembly.

2. The turbine engine of claim 1, wherein the pressurized fluid in the intermediate pressure region provides the aft-to-forward axial force that minimizes the friction between the interfacing aft surfaces of the plurality of seal segments and the stator.

3. The turbine engine of claim 2, wherein the stator comprises a U-shaped cross-sectional shape in an axial direction of the turbine engine that extends from a first side of the seal assembly in the low pressure region to an opposing, second side of the seal assembly.

4. The turbine engine of claim 3, wherein the intermediate pressure region is defined on the second side of the seal assembly.

5. The turbine engine of claim 4, wherein the seal assembly further defines a low pressure vent fluidly connecting the intermediate pressure region to the low pressure region.

6. The turbine engine of claim 5, wherein the low pressure vent extends through one or more of the plurality of seal segments.

7. The turbine engine of claim 5, wherein the low pressure vent is disposed in a through channel that extends through at least a portion of the U-shaped cross-sectional shape of the stator.

8. The turbine engine of claim 5, wherein the high pressure region comprises an exterior high pressure area external to the stator and an interior high pressure area internal of the stator.

9. The turbine engine of claim 8, wherein the seal assembly further comprises a high pressure vent fluidly connecting the exterior high pressure area to the interior high pressure area, wherein the high pressure vent is fluidly separate from the low pressure vent.

10. The turbine engine of claim 1, further comprising at least one of a turbine or a compressor, wherein the rotor is at least one of a turbine rotor of the turbine or a compressor rotor of the compressor.

11. A seal assembly, comprising:
    a plurality of seal segments disposed between a rotor and a stator, wherein, when arranged together, the rotor, the stator, and the plurality of seal segments define a high pressure region and a low pressure region;
    a biasing member engaged with the plurality of seal segments; and
    at least one feature formed in the stator,
    wherein pressurized fluid engaging with the at least one feature provides an aft-to-forward axial force that reduces friction between interfacing aft surfaces of the plurality of seal segments and the stator,
    wherein the at least one feature comprises a recess formed in a surface of the stator that creates an intermediate pressure region between the high pressure region and the low pressure region, and
    wherein the high pressure region is located forward of the low pressure region and the intermediate pressure region is forward of the seal assembly.

12. The seal assembly of claim 11, wherein the pressurized fluid in the intermediate pressure region provides the aft-to-forward axial force that minimizes the friction between the interfacing aft surfaces of the plurality of seal segments and the stator.

13. The seal assembly of claim 12, wherein the stator comprises a U-shaped cross-sectional shape that extends from a first side of the seal assembly in the low pressure region to an opposing, second side of the seal assembly, the intermediate pressure region being defined on the second side of the seal assembly.

14. The seal assembly of claim 13, wherein the seal assembly further comprises a low pressure vent fluidly connecting the intermediate pressure region to the low pressure region, and wherein the low pressure vent is disposed in at least one of a through channel that extends through at least a portion of the U-shaped cross-sectional shape of the stator or through one or more of the plurality of seal segments.

* * * * *